United States Patent
King et al.

(10) Patent No.: US 10,180,985 B2
(45) Date of Patent: Jan. 15, 2019

(54) APPARATUS AND METHOD FOR AUTOMATICALLY REDIRECTING A SEARCH

(71) Applicant: AT&T Intellectual Property I, L.P., Atlanta, GA (US)

(72) Inventors: Robert King, Roswell, GA (US); Sharon E. Carter, Austell, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 86 days.

(21) Appl. No.: 14/626,733

(22) Filed: Feb. 19, 2015

(65) Prior Publication Data

US 2016/0246881 A1    Aug. 25, 2016

(51) Int. Cl.
G06F 17/30 (2006.01)
H04L 29/06 (2006.01)

(52) U.S. Cl.
CPC .. *G06F 17/30864* (2013.01); *G06F 17/30876* (2013.01); *G06F 17/30899* (2013.01); *H04L 63/0815* (2013.01)

(58) Field of Classification Search
CPC . H04L 29/08972; H04L 67/02; H04L 67/327; H04L 67/2814; G06F 17/30887; G06F 17/30861; G06F 17/30864; G06F 17/30867; G06F 17/30876; G06F 17/30884; G06F 17/30038; G06F 17/30882; G06F 17/30902; G06F 17/30899; G06F 17/30896

See application file for complete search history.

(56) References Cited

U.S. PATENT DOCUMENTS

| | | | |
|---|---|---|---|
| 6,544,295 B1 | 4/2003 | Bodnar | |
| 6,694,431 B1* | 2/2004 | Binding | H04L 63/0428 713/152 |
| 6,819,340 B2 | 11/2004 | Burke | |
| 6,842,612 B2 | 1/2005 | Kalish et al. | |
| 7,185,360 B1* | 2/2007 | Anton, Jr. | H04L 63/083 370/252 |
| 7,536,391 B2 | 5/2009 | Christian et al. | |

(Continued)

FOREIGN PATENT DOCUMENTS

| | | |
|---|---|---|
| EP | 2711852 A1 | 3/2014 |
| KR | 20100109689 A | 10/2010 |

OTHER PUBLICATIONS

Gunnar Jurdzik "Firefox Help—Tutorials: Bookmarks", https://web.archive.org/web/20120115210306/http://mozilla.gunnars.net/firefox_bookmarks_tutorial.html; Snapshot taken Jan. 15, 2012.*

(Continued)

*Primary Examiner* — Nelson Giddins

(57) ABSTRACT

Methods, computer-readable media and apparatuses for automatically redirecting a search are disclosed. A processor receives a search term, connects to a search server hosting a search site that displays a plurality of sites in response to the search term, receives a selection of a site from the plurality of sites, provides an option to associate the site with the search term and receives a confirmation to associate the site with the search term, where the search term automatically redirects a connection to a server hosting the site and by-passing a connection to the search server hosting the search site when the search term is received at a later time.

18 Claims, 4 Drawing Sheets

(56) References Cited

U.S. PATENT DOCUMENTS

| | | | |
|---|---|---|---|
| 7,562,113 B2 | 7/2009 | Labarge et al. | |
| 7,735,021 B2 | 6/2010 | Padawer et al. | |
| 7,814,083 B2* | 10/2010 | Kwon | G06F 17/30887 707/705 |
| 7,908,263 B1* | 3/2011 | Paiz | G06F 17/30864 707/708 |
| 8,041,763 B2 | 10/2011 | Kordun et al. | |
| 8,078,624 B2* | 12/2011 | Daya | G06F 21/6218 707/741 |
| 8,234,307 B1* | 7/2012 | Shure | G06F 17/30896 707/706 |
| 8,275,788 B2 | 9/2012 | Gorman et al. | |
| 8,312,015 B1* | 11/2012 | Trevelyan | H04L 67/10 707/735 |
| 8,429,190 B2* | 4/2013 | Gutierrez | G06Q 10/107 707/781 |
| 8,489,560 B1* | 7/2013 | Conroy | G06F 17/30864 705/14.54 |
| 8,528,064 B2 | 9/2013 | Nichols et al. | |
| 8,612,418 B2 | 12/2013 | Civelli et al. | |
| 8,700,788 B2 | 4/2014 | Gailey et al. | |
| 8,751,389 B2 | 6/2014 | Schoenberg | |
| 8,812,737 B2 | 8/2014 | Bilinski et al. | |
| 8,856,685 B2 | 10/2014 | Liu | |
| 8,868,535 B1* | 10/2014 | Paiz | G06F 17/30864 707/706 |
| 8,909,669 B2* | 12/2014 | Shelton | G06F 21/6245 707/722 |
| 8,937,734 B2 | 1/2015 | Pesar | |
| 8,959,234 B2* | 2/2015 | Lee | H04L 63/0815 709/227 |
| 9,794,362 B2* | 10/2017 | Hu | H04L 67/2814 |
| 2003/0061387 A1* | 3/2003 | Brown | H04L 63/02 709/246 |
| 2003/0191647 A1* | 10/2003 | Kam | G06F 17/30864 704/270.1 |
| 2003/0208472 A1* | 11/2003 | Pham | G06F 17/30876 |
| 2005/0114236 A1* | 5/2005 | Hammell | G06Q 10/08 705/28 |
| 2005/0204041 A1* | 9/2005 | Blinn | H04L 63/0815 709/225 |
| 2006/0195442 A1* | 8/2006 | Cone | G06F 17/30867 |
| 2006/0235886 A1* | 10/2006 | Norman | G06F 17/30867 |
| 2007/0043574 A1* | 2/2007 | Coffman | G06F 17/30899 704/275 |
| 2007/0055674 A1* | 3/2007 | Sunada | G06F 17/30011 |
| 2007/0149190 A1* | 6/2007 | Matsuhashi | H04W 8/08 455/432.1 |
| 2007/0174286 A1 | 7/2007 | Seitz et al. | |
| 2008/0162437 A1* | 7/2008 | Choi | G06F 17/30265 |
| 2008/0195477 A1* | 8/2008 | Kennedy | G06Q 30/02 705/14.54 |
| 2008/0235383 A1* | 9/2008 | Schneider | G06F 17/30887 709/229 |
| 2009/0048902 A1* | 2/2009 | Lynn | G06Q 10/06375 705/7.37 |
| 2009/0125482 A1* | 5/2009 | Peregrine | G06F 17/30864 |
| 2009/0240560 A1* | 9/2009 | Tamura | G06F 17/30011 707/738 |
| 2009/0254425 A1* | 10/2009 | Horowitz | G06F 17/30864 705/300 |
| 2009/0328172 A1* | 12/2009 | Das | H04L 67/1027 726/7 |
| 2010/0010944 A1* | 1/2010 | Cheng | G06F 17/30032 706/12 |
| 2010/0083132 A1* | 4/2010 | Ulrich | G06F 17/30873 715/751 |
| 2010/0287480 A1* | 11/2010 | Hicks, III | H04L 12/2809 715/751 |
| 2011/0184936 A1* | 7/2011 | Lymberopoulos | G06F 17/30902 707/721 |
| 2011/0289064 A1* | 11/2011 | Lebeau | G06F 17/3087 707/706 |
| 2012/0084835 A1* | 4/2012 | Thomas | G06F 17/30867 726/3 |
| 2012/0136887 A1* | 5/2012 | Cha | G06F 17/3064 707/767 |
| 2012/0167193 A1* | 6/2012 | Gargaro | G06F 21/41 726/8 |
| 2012/0173565 A1* | 7/2012 | Jacobs | G06F 17/30873 707/769 |
| 2012/0192089 A1* | 7/2012 | Kim | G06F 17/30864 715/760 |
| 2012/0239731 A1* | 9/2012 | Shyamsunder | G06F 17/30876 709/203 |
| 2012/0259832 A1* | 10/2012 | Walker | G06F 17/30887 707/709 |
| 2012/0290724 A1* | 11/2012 | Noro | G06F 17/30887 709/225 |
| 2013/0018944 A1* | 1/2013 | Shyamsunder | G06F 17/30876 709/203 |
| 2013/0042188 A1 | 2/2013 | Dobronsky | |
| 2013/0060759 A1* | 3/2013 | Davis | H04W 4/21 707/723 |
| 2013/0159459 A1* | 6/2013 | Shinkai | H04L 67/02 709/217 |
| 2013/0238624 A1* | 9/2013 | Lee | G06F 17/3064 707/737 |
| 2013/0238750 A1* | 9/2013 | Fu | G06F 17/30876 709/217 |
| 2013/0241952 A1* | 9/2013 | Richman | G06F 17/21 345/619 |
| 2014/0047359 A1* | 2/2014 | Teigene | G06F 17/30864 715/760 |
| 2014/0053074 A1 | 2/2014 | Kim et al. | |
| 2014/0089521 A1* | 3/2014 | Horowitz | H04L 67/02 709/239 |
| 2014/0108436 A1 | 4/2014 | Vishria et al. | |
| 2014/0115539 A1 | 4/2014 | Chou et al. | |
| 2014/0129733 A1* | 5/2014 | Klais | H04L 67/327 709/239 |
| 2014/0136948 A1* | 5/2014 | Miller | G06F 17/30887 715/234 |
| 2014/0156702 A1* | 6/2014 | Shyamsunder | G06F 17/30876 707/769 |
| 2014/0282029 A1* | 9/2014 | Vishria | H04L 29/0809 715/738 |
| 2014/0379683 A1* | 12/2014 | Bazaz | G06F 17/30864 707/706 |
| 2015/0006570 A1* | 1/2015 | Masuko | G06F 17/30722 707/769 |
| 2015/0135290 A1* | 5/2015 | Newman | H04L 63/083 726/6 |
| 2015/0143536 A1* | 5/2015 | Shelton | G06F 21/6245 726/27 |
| 2015/0161253 A1* | 6/2015 | Shah | G06F 17/2247 715/234 |
| 2015/0220638 A1* | 8/2015 | Motoyama | G06F 17/30864 707/722 |
| 2015/0278902 A1* | 10/2015 | Warren | G06Q 30/0623 705/26.61 |
| 2015/0310527 A1* | 10/2015 | Warren | G06Q 30/0625 705/26.62 |
| 2015/0326517 A1* | 11/2015 | Block | H04L 29/06 726/7 |
| 2015/0326564 A1* | 11/2015 | Wang | G06Q 40/02 726/6 |
| 2015/0334080 A1* | 11/2015 | Tamayo | H04L 67/10 709/203 |
| 2015/0339387 A1* | 11/2015 | Dotsenko | G06F 17/30864 715/739 |
| 2015/0347582 A1* | 12/2015 | Lovelace | G06F 17/30864 707/706 |
| 2015/0350338 A1* | 12/2015 | Barnett | H04L 67/143 709/203 |

(56) References Cited

U.S. PATENT DOCUMENTS

| | | | | |
|---|---|---|---|---|
| 2015/0365393 | A1* | 12/2015 | Shyamsunder ... | G06F 17/30876 726/4 |
| 2016/0232250 | A1* | 8/2016 | Sugawara ......... | G06F 17/30899 |
| 2018/0067994 | A1* | 3/2018 | Lu ..................... | G06F 17/30867 |

OTHER PUBLICATIONS

Mozilla Support "Where are my logins stored?", https://web.archive.org/web/20140604065530/https://support.mozilla.org/en-US/kb/where-are-my-logins-stored; Snapshot taken Jun. 4, 2014.*

Search Engine Land, "Yahoo Officially Rolls Out New Yahoo Search Results Design", https://web.archive.org/web/20130608050119/https://searchengineland.com/yahoo-officially-rolls-out-new-yahoo-search-results-design-162023; Dated Jun. 5, 2013.*

Liam Tung, "Google's back: Its Firefox's default search engine again, after Mozilla ends Yahoo deal", Nov. 15, 2017, http://www.zdnet.com/article/googles-back-its-firefoxs-default-search-engine-again-after-mozilla-ends-yahoo-deal/.*

"Knowledge Base: Using ThinApp ThinDirect to set up redirection from the native Internet Explorer to a virtual browser such as virtual Internet Explorer 6 (VirtIE6) (1026566)," VMWare, kb.vmware.com http://kb.vmware.com/selfservice/microsites/search.do?language=en_US&cmd=displayKC&externalId=1026566 "ThinApp ThinDirect allows you to specify particular web pages to be redirected" and "If you wish to implement ThinApp ThinDirect, you must create a ThinDirect.txt file for the virtual browser that you want to redirect web pages to."

Rogers, Matthew, "Create Short Aliases for Frequently Accessed Pages by Telling Chrome They're Search Engines," LifeHacker, lifehacker.com, Jun. 24, 2011. http://lifehacker.com/5815291/create-short-aliases-for-frequently-accessed-pagesby-telling-chrome-theyre-search-engines Discloses method of using short aliases in browser address bar.

Zibada, "URL Alias 2.3.2," Add-Ons, Mozilla Firefox, Oct. 23, 2013. https://addons.mozilla.org/en-US/firefox/addon/url-alias-8703/ Allows the use of short strings/keywords in the address bar to bind to URL patterns.

"Using keyword searches," MozillaZine, kb.mozillazine.org http://kb.mozillazine.org/Using_keyword_searches. Keywords can be specified for bookmarks by filling in the "Keyword" field in the bookmark's Properties. When you type the keyword into the Location Bar and hit [Enter], the keyword will be replaced with the bookmarked URL. Keywords can be stored in a file. In Mozilla Firefox, you can simply right-click in a search field on a web page and choose "Add a Keyword for this Search."

Scott, "Launching Favorites from the Address Bar with Keyword Names," IEBlog, blogs.msdn.com, Jul. 26, 2004. http://blogs.msdn.com/b/ie/archive/2004/07/26/197754.aspx "Here is a tip to make your IE favorites more powerful. You can make the name of favorites keywords that if typed in the address bar will launch the favorite."

* cited by examiner

APPARATUS AND METHOD FOR AUTOMATICALLY REDIRECTING A SEARCH

The present disclosure relates generally to technology for searching and accessing websites on the Internet and, more particularly, to an apparatus, method and a computer-readable medium for automatically redirecting a search.

BACKGROUND

Currently, users are encouraged to install a special software application (app) for nearly every webs service for mobile devices. An app can provide a better user experience than a web page, but apps have known disadvantages as they may cause security threats, can be unreliable or cause device instability, conflict with other apps, mine the device for personal information, take up device storage and introduce maintenance issues due to the need to install, update and uninstall the app on the mobile device.

Alternatively, maintaining a long list of bookmarks on the web browser is difficult and inherently limited to a particular browser on a particular device. Also, doing a visual search along the bookmarks is time consuming. As a result, many users have fewer bookmarks and rely on a search engine instead on the web browser.

Search engines may be good at giving a close match near the top of the results, but the results returned and their ordering can be subject to influences that are beyond the control of the user. A search result that a user has come accustomed to expecting can be altered by new entries or indexing, tampered ratings or advertised/sponsored sites. Thus, an expected or customary order of results of a search may be disrupted or altered.

SUMMARY

In one example, the present disclosure discloses a method, computer-readable medium, and apparatus for automatically redirecting a search. For example, the method may include a processor that receives a search term, connects to a search server hosting a search site that displays a plurality of sites in response to the search term, receives a selection of a site from the plurality of sites, provides an option to associate the site with the search term and receives a confirmation to associate the site with the search term, where the search term automatically redirects a connection to a server hosting the site and by-passing a connection to the search server hosting the search site when the search term is received at a later time.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses methods, computer-readable media and devices for automatically redirecting a search. As discussed above, many users look for a website by entering a search term in an address bar of a web browser to search for a website based on search results of a default search engine associated with the web browser's address bar. However, the results returned and their ordering can be subject to influences that are beyond the control of the user. A search result that a user has come accustomed to expecting can be altered by new entries or indexing, tampered ratings or advertised/sponsored sites. Thus, an expected or customary order of results of a search may be disrupted or altered.

One embodiment of the present disclosure allows a user to associate a search term with a site such that when the search term is entered at a later time, the web browser will automatically redirect the user to the site without accessing the search site. As a result, the user no longer needs to bookmark a website or use a specialized app. Rather, the user may associate a search term that is relevant to the user with a desired site such that the search term will automatically redirect the user to the desired site.

Figure 1:
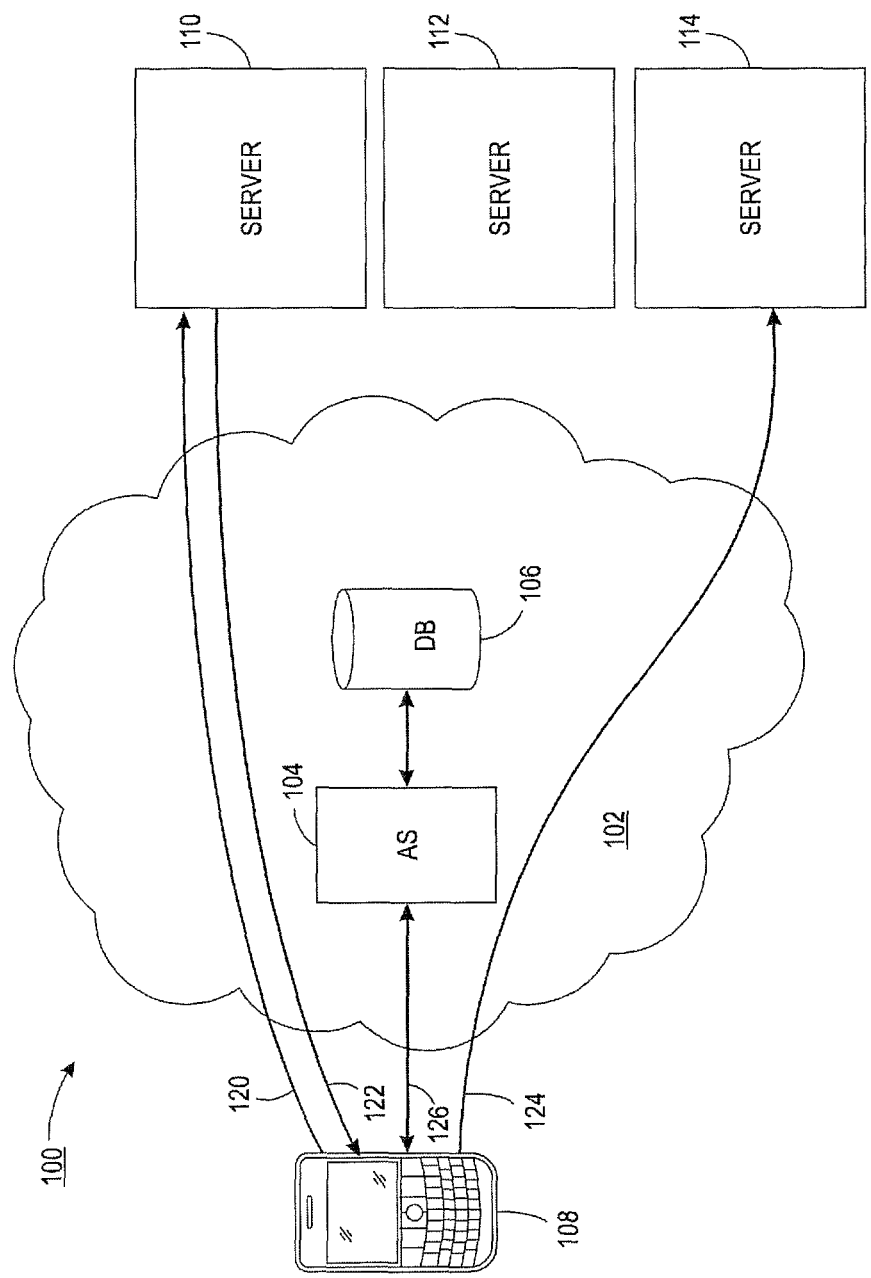
FIG. 1 illustrates an example network related to the present disclosure.

To aid in understanding the present disclosure, FIG. 1 illustrates a communications network 100. In one embodiment, the communications network 100 may include an Internet Protocol (IP) network 102. The IP network 102 may include an application server (AS) 104 and a database (DB) 106. Although only a single AS 104 and a single DB 106 is illustrated in FIG. 1, it should be noted that any number of application servers and databases may be deployed.

For example, the AS 104 may be controlled by a service provider of the communications network 100 that also provides automatic redirection services described herein. For example, associations created between a search term and a site may be established by the AS 104 and stored in the DB 106. The DB 106 may also store authentication credentials of the user for one or more different sites. In other words, the associations created by the user and the authentication credentials for automatically logging into various sites may be stored in the "cloud" by the AS 104 and the DB 106.

It should be noted that the IP network 102 has been simplified for ease of explanation. The IP network 102 may include additional network elements that are not shown, such as for example, a gateway, a firewall, a call control element, one or more access networks, and the like. In one embodiment, the IP network 102 may be a cellular communications network (e.g., a 3G, 4G, LTE, and the like).

In one embodiment, the communications network 100 may also include an endpoint device 108 and one or more servers 110, 112 and 114. The servers 110, 112 and 114 may include a processor and a memory and be deployed as a computer similar to the computer illustrated in FIG. 4 and discussed below.

In one embodiment, the servers 110, 112 and 114 may be deployed to host sites (e.g., web sites). For example, the server 110 may be a search server that hosts a search site. The servers 112 and 114 may host different websites such as a news website and a bank website, respectively. Although particular types of example sites are described above, it should be noted that the servers 110, 112 and 114 may host any type of websites. It should be noted that although three servers are illustrated in FIG. 1 that any number of servers may be deployed.

In one embodiment, the endpoint device 108 may be any type of endpoint device that can run a web browser application and communicate with the IP network 102 and the servers 110, 112 and 114 via either a wired or wireless connection. For example, the endpoint device 108 may be a desktop computer, a laptop computer, a tablet computer, a netbook computer, a smartphone, a cell phone, and the like. Although only a single endpoint device 108 is illustrated in FIG. 1, it should be noted that any number of endpoint devices 108 may be deployed.

In one embodiment, a user of the endpoint device 108 may want to access a site of a bank hosted by the server 114. However, the user may not remember the exact universal resource locator (URL) address of the bank site on the server 114. As a result, the user may enter a search term, such as "bank" in an address bar of a web browser running on the endpoint device 108. Currently, many web browsers have an address bar that is also associated with a search engine (e.g., Google®, Bing®, Yahoo®, and the like). When the user enters a search term in the address bar, the web browser may automatically redirect the user to a search site of the search engine that displays a plurality of different sites based on the search term.

In one embodiment, the search term may be provided using a variety of different input methods. For example, the search term may be provided by voice. Although the examples described herein are specific to an address bar of a web browser and specific sites or pages, it should be noted that the search term may be provided to any application that automatically redirects the application to a preferred landing spot. For example, the preferred landing spot may be another application, another file, and the like.

In one embodiment, although the term "site" is used to refer to a web page, it should be noted that the term "site" may be broadly interpreted to include any one of the landing spots described above (e.g., another application, another file, and the like).

Figure 2:
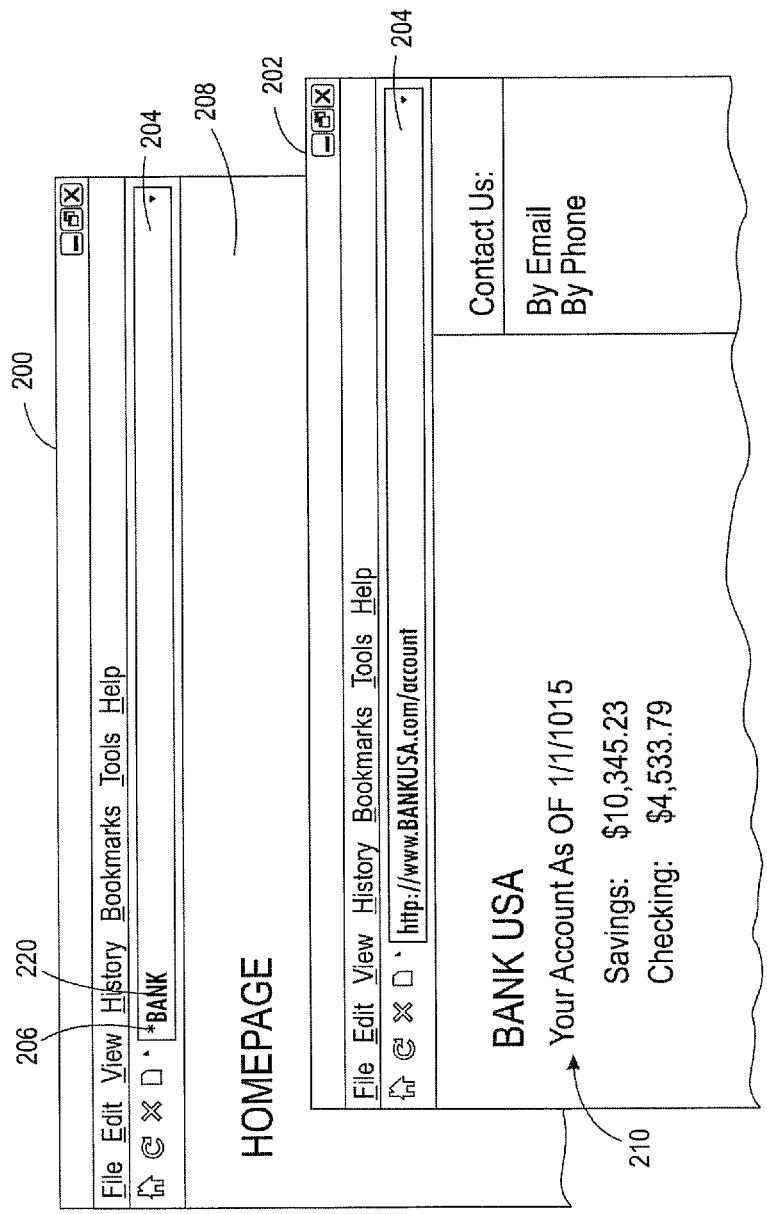
FIG. 2 illustrates example user interface of the present disclosure.

In one embodiment of the present disclosure, the user may create an association between the search term and a preferred site such that the web browser will be automatically redirected to the preferred site without first being directed to the search site's listing of results. FIG. 2 illustrates a first site 208 on a web browser 200. FIG. 1 and FIG. 2 may be referred to interchangeably to describe the automatic redirection.

In one embodiment, the web browser 200 may have an address bar 204 and be opened to the first site 208 (e.g., a homepage). Currently, when a user enters a search term 220 into the address bar 204, the endpoint device 108 will connect to the search server 110 that hosts the search site associated with the address bar 204 as shown by connection 120 in FIG. 1.

The search site will return a plurality of different sites that match the search term 220. The endpoint device 108 may then receive the results of the plurality of different sites and display the plurality of different sites to the user via a display of the endpoint device 108 as shown by connection 122 in FIG. 1. When the endpoint device 108 receives a selection of one of the sites (e.g., a bank site) from the user, the web browser 200 may then be redirected to the second site 210 that is selected (e.g., the bank site) hosted by the server 114 as shown by connection 124 in FIG. 1.

However, in one embodiment of the present disclosure, when the endpoint device 108 receives a selection of one of the plurality of different sites, the endpoint device 108 may provide an option to the user to associate the preferred site 210 with the search term 220. In one embodiment, the option may be provided as a pop-up window, as a separate application, a drop down menu, and the like.

If the endpoint device 108 receives a confirmation to create the association, the endpoint device 108 may establish a connection with the AS 104 to store the association. In one embodiment, the association may be stored locally on the endpoint device 108. However, by storing the association in "the cloud" via the AS 104 and the DB 106, the association may be accessed when a user logs into any endpoint device, e.g., a smartphone, a desktop computer, a laptop, and so on.

In one embodiment, the options provided to the user may also include options to maintain previously stored associations between a search term and one or more preferred sites. For example, a preferred site may have been retired by a company, may no longer exist, or the URL link may be broken. As a result, the user may dissociate the search term to the preferred site, re-assign the search term to another preferred site, and the like.

In another embodiment, the user may want to change the search term associated with the preferred site. For example, although the search term "bank" was used to find the user's bank website, the user may change the search term to "Benjamins" to be associated with the preferred site of the user's account summary site within the bank's website. In other words, the search terms and associations may be personal to the user and not based on a mapping created by the search site or another third party. The user may obscure the search term, or use a completely unrelated search term, as a security measure to prevent another user from reaching the website (e.g., if the user forgets to log out and another family member uses the same search term, then the other family member will be automatically directed to a preferred site of the user).

As a result, at a later time when the user enters the search term 220 into the address bar 204, the web browser 200 may be redirected to the second preferred site 210 hosted on the server 114 directly rather than first connecting to the search server 110 as shown in a second web browser window 202. In other words, by creating the association between the search term 220 and the second preferred site 210 the connections 120 and 122 are eliminated. As a result, when the search term 220 is entered in the address bar 204 only the connection 124 is established.

In one embodiment, the search term 220 may be entered with a redirection indicator 206. The redirection indicator 206 may be an alphanumeric code or symbol such that the endpoint device 108 knows the search term 220 is for automatic redirection. In other words, without the redirection indicator 206, the endpoint device 108 may establish the connection 120 with the search server 110 to perform a search on the search site.

In another embodiment, the redirection indicator 206 may be a check mark in a checkbox or other similar graphical user interface element to toggle the automatic redirection on and off. In another embodiment, the redirection indicator 206 may be a button that turns the automatic redirection on and off that is created on the web browser. In another embodiment, the redirection indicator 206 may be a radio button that can be used with options for turning or toggling automatic redirection on and automatic redirection off. In one embodiment, the automatic redirection may allow the user to be redirected into a site (or different pages within the site) that would otherwise only be reachable after a log in screen. For example, the second site 210 associated with the search term 220 may be an account summary of a user's bank account. Typically, the user would first be required to provide authentication credentials at a log in screen of the bank's site before reaching the account summary of a user's bank account.

In one embodiment, the authentication credentials for one or more different sites may be stored in "the cloud" via the AS 104 and the DB 106. As a result, when the redirection indicator 206 is detected by the endpoint device 108, the endpoint device 108 may determine if the site associated with the search term requires authentication credentials, retrieve the authentication credentials from the AS 104, log into the site with the authentication credentials and redirect the web browser 200 to the second site 210 automatically.

In other words, the user may have previously associated the search term "bank" with a preferred page within the larger bank site, in this case, the user's account summary site that could otherwise only be reachable after going to a login site of the bank, providing authentication credentials and then clicking on a link to the user's account summary. At a later time, the user may enter the search term "bank" in the address bar 204 of the web browser 200. The endpoint device 108 may detect that the account summary site requires authentication credentials. The endpoint device 108 may receive the authentication credentials from the AS 104, log into the site of the bank, and then redirect the web browser 200 directly to the account summary site of the user. Notably, the login site of the bank would never be shown to the user. Said another way, the web browser 200 would be automatically redirected from first site 208 directly to the second site 210 hosted on the server 114 without any other sites or pages being visited or connections being made to other servers 110 or 112.

The user would not be required to look through any bookmarks, open any separate apps on the endpoint device, click through links on a search site, remember a URL address of a specific page, and the like. Rather, the user may simply enter a search term 220 that was previously associated with a desired site and the web browser 200 would be automatically redirected to the desired site, page or other landing point.

In one embodiment, the user may store login credentials in the DB 106 via the AS 104. As noted above, multiple different users may use the web browser 200 running on the endpoint device 108. To allow each user to create unique associations between a search term and a site, the web browser 200 may be modified to require a login of a user.

To illustrate, John Doe and Jane Doe may share the same endpoint device 108 at home, but use different bank accounts. As a result, John Doe may associate the search term "bank" with Bank ABC and Jane Doe may associate the search term "bank" with BANK XYZ. When John Doe uses the endpoint device 108, John Doe may log into the web browser 200 with his username and password. The login may allow the endpoint device 108 to access John Doe's associations between search terms and sites from the DB 106 via the AS 104. Thus, when John Doe enters "bank" into the address bar 204, the web browser 200 will be redirected automatically to an account summary site of BANK ABC.

At a later time, Jane Doe may use the same endpoint device 108 as John Doe. Jane Doe may log into the web browser 200, or the endpoint device 108 that saves specific settings of the web browser 200 for each different user, with her username and password. The login may allow the endpoint device 108 to access Jane Doe's associations between search terms and sites from the DB 106 via the AS 104. Thus, when Jane Doe enters "bank" into the address bar 204, the web browser 200 will be redirected automatically to an account summary site of BANK XYZ.

Notably, although two different users used the same endpoint device 108, the same search term was redirected to two different sites based upon the login of a particular user. In one embodiment, the associations may be stored locally on the endpoint device 108. For example, if only a single user uses the endpoint device 108 (e.g., a personal smartphone of a user), then associations may be stored locally and no log in may be required.

Thus, embodiments of the present disclosure allow a user to create an association between a search term and a site. The search term may be any phrase or words that are meaningful to a user. Thus, the user may remember the search term more easily than trying to remember a specific URL of a company. This may be true especially for secondary pages within the company's site that would otherwise only be reachable after a log in screen.

Figure 3:
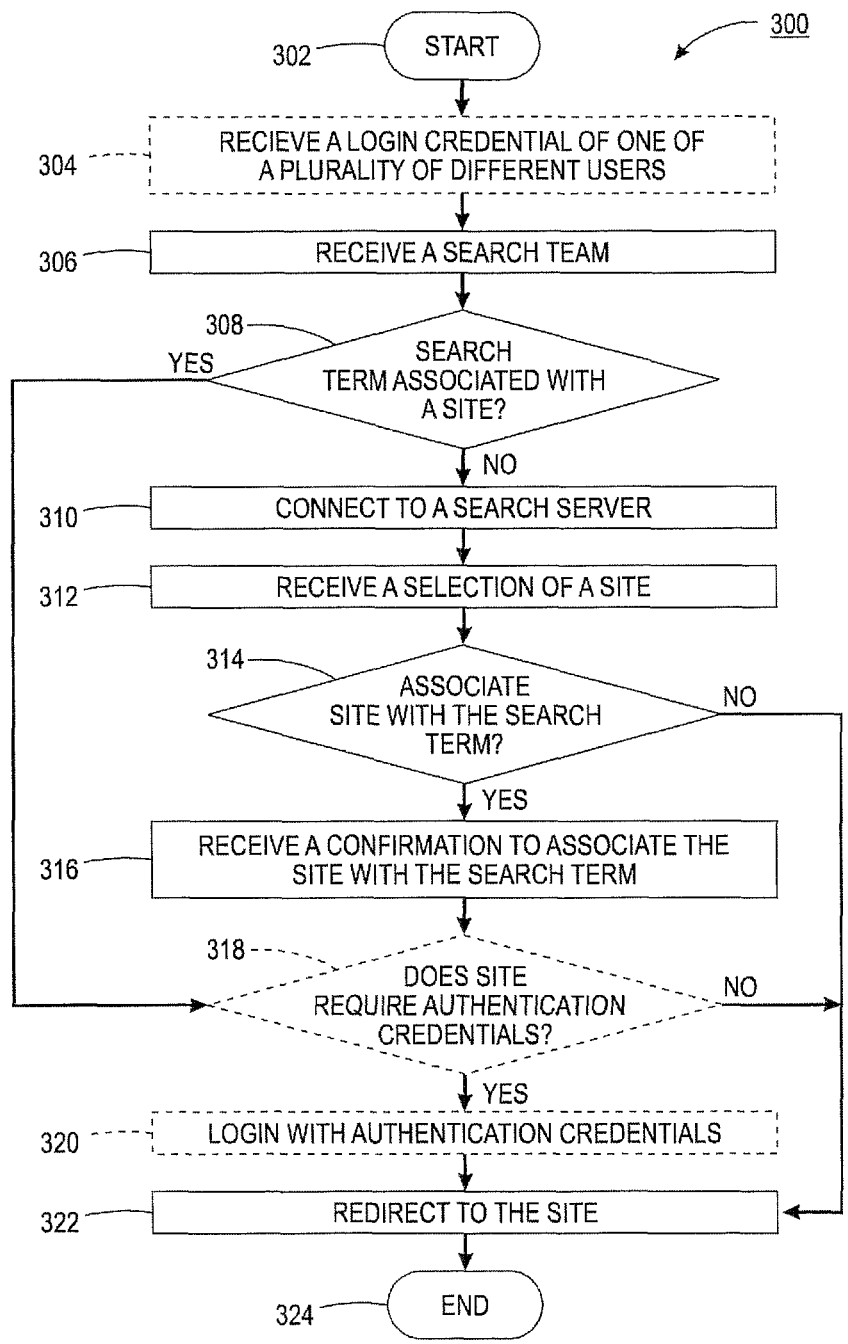
FIG. 3 illustrates a flowchart of an example method for automatically redirecting a search.

FIG. 3 illustrates a flowchart of a method 300 for automatically redirecting a search in accordance with the present disclosure. In one embodiment, steps, functions and/or operations of the method 300 may be performed by an endpoint device 108. In one embodiment, the steps, functions, or operations of method 300 may be performed by a computing device or system 400, and/or processor 402 as described in connection with FIG. 4 below. For illustrative purpose, the method 300 is described in greater detail below in connection with an embodiment performed by a processor, such as processor 402.

The method 300 begins in step 302. At an optional step 304, a processor receives a login credential of one or a plurality of different users. For example, an endpoint device may be used by different users and the associations made between search terms and various websites may be unique for each one of the different users. As a result, each user may be required to login.

In addition, the user may have a plurality of different endpoint devices for accessing the internet or world wide web. For example, the user may have a desktop computer at home, a smartphone, a tablet computer, and the like. Thus, by logging in, the user may have any associations between a search term and a site that were previously created (as discussed below) available on any endpoint device accessed by the user.

At step 306, the processor receives a search term. For example, the user may enter a search term in an address bar of a web browser. Typically, the address bar may be equipped with a search functionality. Thus, when a user enters a search term in the address bar, the user may be directed to a searching web site that displays a plurality of sites that are a closest match to the search term.

At step 308, the processor determines whether the search term is associated with a site. For example, the user may have previously associated the search term with a desired site. In one embodiment, the processor may determine that the search term is associated with a site already if a redirection indicator is received with the search term. In one embodiment, the redirection indicator may be an alphanumeric code and/or symbol entered with the search term. For example, an asterisk, a dollar sign, an equal sign, an exclamation point and so on, may be placed in front of the search term indicating that the search term is associated with a site and the web browser should perform an automatic redirection.

In other words, the web browser would not connect to a search server and display search results. Rather, the web browser may be redirected to a URL of a site associated with the search term. In another example, a code (e.g., "ar" for automatic redirection or "kw" for keyword) may be used as a redirection indicator. The code may be located as a prefix or a suffix to the search term.

In another embodiment, the redirection indicator may be a check mark in a checkbox or other similar graphical user interface element to toggle the automatic redirection on and off. In another embodiment, the redirection indicator may be a button that turns the automatic redirection on and off that is created on the web browser. In another embodiment, the redirection indicator may be a radio button that can be used with options for turning or toggling the automatic redirection on and off.

If the search term is associated with a site, the method 300 may proceed to step 318. However, if the search term is not associated with a site, the method 300 may proceed to step 310.

At step 310, the processor may connect to a search server. For example, the search server may be hosting a search site that displays a plurality of sites in response to the search term. Any search site may be used or associated with the address bar of the web browser. In one embodiment, the plurality of sites may be displayed in an order based on a closest match to the search term, based on popularity, based on advertising dollars spent, and the like.

At step 312, the processor receives a selection of a site from the plurality of sites. For example, the user may enter "bank" in the address bar of the web browser and a list of a variety of different banking websites may be displayed at step 310. The user may select the site associated with his or her bank and click on the link to the website of the user's bank.

At step 314, the processor may determine if the user would like to associate the site with the search term. Associating the site with the search term may allow the search term to automatically redirect a connection to a server hosting the site and by-passing a connection to the search server hosting the search site when the search term is received at a later time.

If the answer to step 314 is no, the method 300 may proceed to step 322. However, if the answer to step 314 is yes, the method 300 may proceed to step 316.

At step 316, the processor may receive a confirmation to associate the site with the search term. In one embodiment, the association between the site and the search term may be stored in a user profile associated with the user's login. In one embodiment, the association may be stored in "the cloud" on a database via an application server in a communications network. In another embodiment, the association may be stored locally on an endpoint device. For example, at step 304 the next time the user logs in, the search term and the site may be already associated. As a result, when the user enters the search term at a later time, the answer to step 308 may be yes and the method may proceed to optional step 318.

At optional step 318, the processor may determine if the site requires authentication credentials. In one embodiment, the user may store authentication credentials for one or more sites with the user's login information. For example, the user may associate an account summary site of the user's bank with the search term "bank." Typically, the user would be required to log in the bank site with authentication credentials (e.g., a login and password). Then the user could select a link to an account summary page after logging into the site. If the account summary page is bookmarked and the user attempts to return to the account summary page directly, the user is usually redirected to a login page. In other words, the user cannot directly access the account summary page at a later time.

However, one embodiment of the present disclosure allows the user to associate a site that would only otherwise be accessible after interacting with a login screen obtained via the search term, and allow the user to be automatically redirected directly to the site that would otherwise require a login. For example, the processor may automatically provide the authentication credentials to allow the redirection to proceed to the site.

At optional step 320, the processor may log in with the authentication credentials. As a result, the redirection may automatically occur directly to the desired site that would otherwise only be accessible after interacting with a login screen.

At step 322, the processor redirects the web browser to the site. It should be noted that if the method 300 arrives at step 322 directly from step 308, the web browser was redirected directly from a search term that was entered into an address bar of the web browser. In other words, the web browser did not first connect to the search server of a search site and then get redirected to the site. Rather, the endpoint device and web browser are modified to identify the search term as being associated with a site and redirect the web browser directly to the site, thereby, by-passing a connection to the search server of the search site. Said another way, even though the search term was entered into a searching field that would typically result in a search being performed by the default search site associated with the web browser, the web browser would be redirected to connect with the server hosting the site without ever connecting to the search server of the search site. At step 324, the method 300 ends.

It should be noted that although not specifically specified, one or more steps, functions or operations of the method 300 may include a storing, displaying and/or outputting step as required for a particular application. In other words, any data, records, fields, and/or intermediate results discussed in the respective methods can be stored, displayed and/or outputted to another device as required for a particular application. Furthermore, steps or blocks in FIG. 3 that recite a determining operation or involve a decision do not necessarily require that both branches of the determining operation be practiced. In other words, one of the branches of the determining operation can be deemed as an optional step. In addition, one or more steps, blocks, functions or operations of the above described method 300 may comprise optional steps, or can be combined, separated, and/or performed in a different order from that described above, without departing from the example embodiments of the present disclosure.

As such, the present disclosure provides at least one advancement in the technical field of web browsers and how endpoint devices are connected to servers hosting websites. This advancement allows for a system to automatically redirect users to a desired website based on a key word entered in an address bar of a web browser that is typically used for web searches. The present disclosure also provides a transformation of data. For example, a redirection indicator in combination with a key word search can be used to automatically redirect a user to a desired website without first connecting to a search server.

Finally, embodiments of the present disclosure improve the functioning of a computing device, e.g., a server and/or a user endpoint device. Namely, an endpoint device dedicated for automatically redirecting a search is created that was not previously available.

Figure 4:
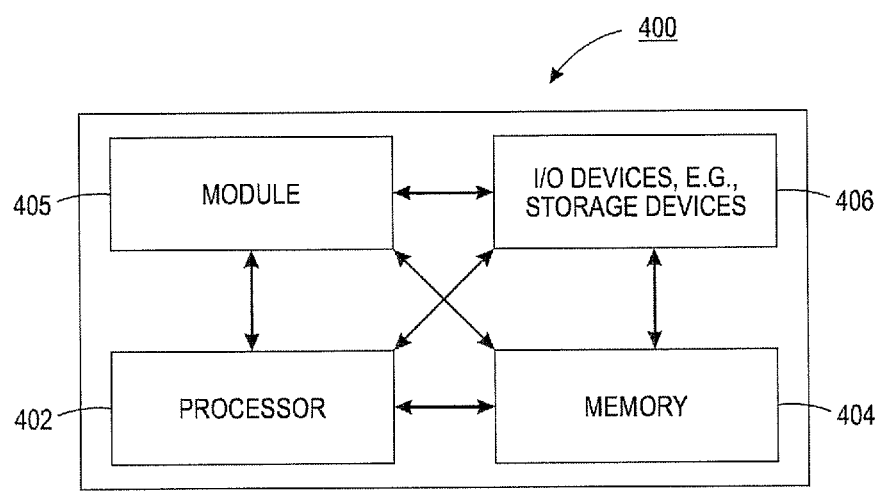
FIG. 4 illustrates a high-level block diagram of a computer suitable for use in performing the functions described herein.

FIG. 4 depicts a high-level block diagram of a computing device suitable for use in performing the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for automatically redirecting a search, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 300, as discussed above, is implemented in a distributed or parallel manner for a particular illustrative example, i.e., the steps of the above method 300, or the entirety of method 300 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one embodiment, instructions and data for the present module or process 405 for automatically redirecting a search (e.g., a software program comprising computer-executable instructions) can be loaded into memory 404 and executed by hardware processor element 402 to implement the steps, functions or operations as discussed above in connection with the illustrative method 300. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for automatically redirecting a search (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method, comprising:
receiving, by a processor of an endpoint device, a search term;
connecting, by the processor, to a search server hosting a search site that returns a plurality of sites in response to the search term, wherein the endpoint device is distinct from the search server;
receiving, by the processor, the plurality of sites from the search site;
receiving, by the processor, a selection of a site from the plurality of sites;
requesting, by the processor, whether to associate the site with the search term in response to the receiving the selection;
receiving, by the processor, a confirmation to associate the site with the search term;
storing, by the processor, an association of the site with the search term;
performing, by the processor via a web browser, a redirection to a server hosting the site based on a reception of the search term at a later time;
automatically connecting, by the processor, to an application server storing authentication credentials;
automatically receiving, by the processor, an authentication credential of a user for the site from the application server; and
automatically logging in to the site, by the processor, with the authentication credential based on the reception of the search term and the redirection to the server hosting the site.

2. The method of claim 1, further comprising:
receiving, by the processor, a login credential for one of a plurality of different users; and
associating, by the processor, the site with the search term for the one of the plurality of different users.

3. The method of claim 1, wherein the redirection to the site is to a site that would otherwise only be reachable after a login screen.

4. The method of claim 1, further comprising:
receiving, by the processor, a redirection indicator with the search term at the later time to instruct the web browser to automatically perform the redirection to the server hosting the site and by-pass the connecting to the search server.

5. The method of claim 4, wherein the redirection indicator comprises an alphanumeric code entered with the search term.

6. The method of claim 1, wherein the requesting whether to associate the site with the search term further comprises requesting whether to associate the site with the search term for a plurality of different endpoint devices associated with the user.

7. A non-transitory computer-readable medium storing instructions which, when executed by a processor of an endpoint device, cause the processor to perform operations, the operations comprising:
- receiving a search term;
- connecting to a search server hosting a search site that returns a plurality of sites in response to the search term, wherein the endpoint device is distinct from the search server;
- receiving the plurality of sites from the search site;
- receiving a selection of a site from the plurality of sites;
- requesting whether to associate the site with the search term in response to the receiving the selection;
- receiving a confirmation to associate the site with the search term;
- storing an association of the site with the search term;
- performing, via a web browser, a redirection to a server hosting the site based on a reception of the search term at a later time;
- automatically connecting to an application server storing authentication credentials;
- automatically receiving an authentication credential of a user for the site from the application server; and
- automatically logging in to the site with the authentication credential based on the reception of the search term and the redirection to the server hosting the site.

8. The non-transitory computer-readable medium of claim 7, the operations further comprising:
- receiving a login credential for one of a plurality of different users; and
- associating the site with the search term for the one of the plurality of different users.

9. The non-transitory computer-readable medium of claim 7, wherein the redirection to the site is to a site that would otherwise only be reachable after a login screen.

10. The non-transitory computer-readable medium of claim 7, the operations further comprising:
- receiving a redirection indicator with the search term at the later time to instruct the web browser to automatically perform the redirection to the server hosting the site and by-pass the connecting to the search server.

11. The non-transitory computer-readable medium of claim 10, wherein the redirection indicator comprises an alphanumeric code entered with the search term.

12. The non-transitory computer-readable medium of claim 7, wherein the requesting whether to associate the site with the search term further comprises requesting whether to associate the site with the search term for a plurality of different endpoint devices associated with the user.

13. An endpoint device, comprising:
- a processor; and
- a computer-readable storage device storing a plurality of instructions which, when executed by the processor, cause the processor to perform operations, the operations comprising:
  - receiving a search term;
  - connecting to a search server hosting a search site that returns a plurality of sites in response to the search term, wherein the endpoint device is distinct from the search server;
  - receiving the plurality of sites from the search site;
  - receiving a selection of a site from the plurality of sites;
  - requesting whether to associate the site with the search term in response to the receiving the selection;
  - receiving a confirmation to associate the site with the search term;
  - storing an association of the site with the search term;
  - performing, via a web browser, a redirection to a server hosting the site based on a reception of the search term at a later time;
  - automatically connecting to an application server storing authentication credentials;
  - automatically receiving an authentication credential of a user for the site from the application server; and
  - automatically logging in to the site with the authentication credential based on the reception of the search term and the redirection to the server hosting the site.

14. The endpoint device of claim 13, the operations further comprising:
- receiving a login credential for one of a plurality of different users; and
- associating the site with the search term for the one of the plurality of different users.

15. The end-point device of claim 13, wherein the redirection to the site is to a site that would otherwise only be reachable after a login screen.

16. The endpoint device of claim 13, the operations further comprising:
- receiving a redirection indicator with the search term at the later time to instruct the web browser to automatically perform the redirection to the server hosting the site and by-pass the connecting to the search server.

17. The endpoint device of claim 16, wherein the redirection indicator comprises an alphanumeric code entered with the search term.

18. The endpoint device of claim 13, wherein the requesting whether to associate the site with the search term further comprises requesting whether to associate the site with the search term for a plurality of different endpoint devices associated with the user.

* * * * *